(12) United States Patent
Hönig et al.

(10) Patent No.: US 6,959,906 B2
(45) Date of Patent: Nov. 1, 2005

(54) BLOW-OFF VALVE FOR A HYDRAULIC DASHPOT

(75) Inventors: Michael Hönig, Ennepetal (DE); Günter Poetsch, Sersheim (DE); Hendrik Kloss, Hamburg (DE); Stefan Mages, Hürth (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 41 days.

(21) Appl. No.: 10/773,813

(22) Filed: Feb. 6, 2004

(65) Prior Publication Data

US 2004/0154663 A1   Aug. 12, 2004

(30) Foreign Application Priority Data

Feb. 11, 2003  (DE) ................................ 103 05 386

(51) Int. Cl.[7] .............................................. F16F 9/34
(52) U.S. Cl. ................. 251/48; 188/282.6; 188/282.8; 188/322.15
(58) Field of Search .......................... 188/282.5, 282.6, 188/282.8, 282.9, 322.15; 251/48–55

(56) References Cited

U.S. PATENT DOCUMENTS

| | | | | |
|---|---|---|---|---|
| 3,756,357 A | * | 9/1973 | Graff et al. ............... | 188/282.6 |
| 3,763,970 A | * | 10/1973 | Anderson ................. | 188/282.1 |
| 3,945,474 A | * | 3/1976 | Palmer .................... | 188/322.15 |
| 3,958,672 A | * | 5/1976 | Keilholz ................... | 188/277 |
| 5,148,897 A | * | 9/1992 | Vanroye .................. | 188/322.22 |
| 5,293,971 A | * | 3/1994 | Kanari et al. ............. | 188/282.1 |
| 5,566,796 A | * | 10/1996 | De Kock .................. | 188/282.1 |
| 6,276,498 B1 | * | 8/2001 | Kirchner .................. | 188/282.5 |
| 6,371,264 B1 | * | 4/2002 | Deferme ................. | 188/322.15 |
| 6,868,947 B2 | * | 3/2005 | Adamek et al. .......... | 188/322.2 |
| 2001/0023801 A1 | * | 9/2001 | Fenn et al. ............. | 188/322.15 |
| 2002/0056368 A1 | * | 5/2002 | May ............................ | 92/248 |
| 2004/0079599 A1 | * | 4/2004 | May ........................ | 188/282.5 |

* cited by examiner

*Primary Examiner*—J. Casimer Jacyna
(74) *Attorney, Agent, or Firm*—Max Fogiel

(57) ABSTRACT

A blow-off valve for a hydraulic dashpot comprising a fluid charged cylinder (1) and a piston (3) that travels back and forth therein on the end of a piston rod. The piston partitions the cylinder into two compartments (6 & 7) and is provided with breaches (4) and shock-absorbing valves. The piston rod (2) or an extension (8) thereof is hollow and accommodates operating components (13).

The object is a valve that can be accommodated along with the hydraulic lines that serve it outside the piston rod or an extension thereof.

The outer surface of the piston rod is accordingly provided with at least one axial inwardly undulating groove (14) at least as long as the piston, including its fastenings and operating components, is high. Alternatively, the bore that extends through the piston rod or its extension and its fastenings and operating components is provided with a similar radially outward groove that can be closed off at the compression end by a spring-loaded valve.

6 Claims, 1 Drawing Sheet

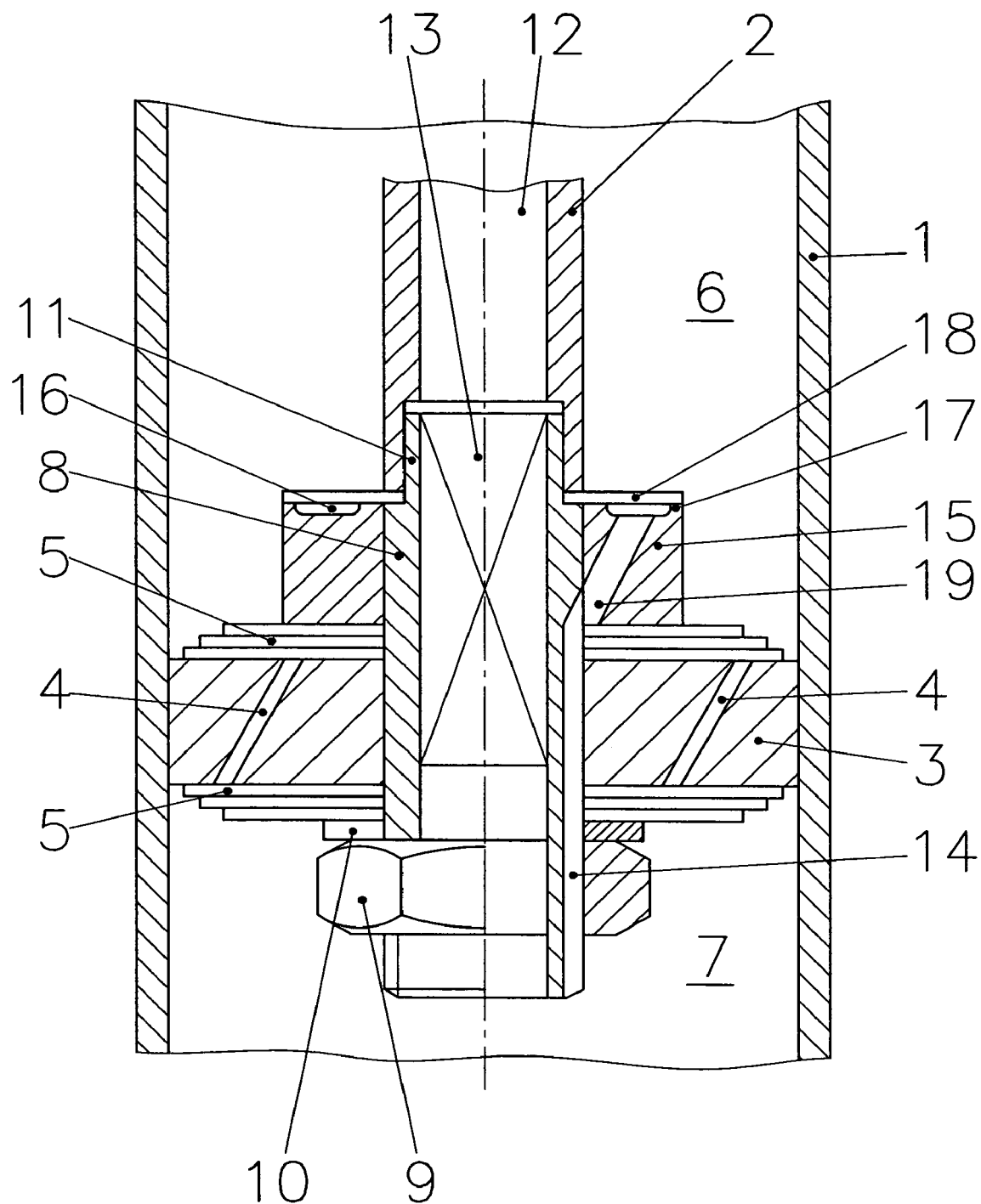

BLOW-OFF VALVE FOR A HYDRAULIC DASHPOT

BACKGROUND OF THE INVENTION

The present invention concerns a blow-off valve for a hydraulic dashpot.

Hydraulic dashpots are employed to absorb shock accompanying the motion of wheel suspensions attached by way of springs, preferably in motor vehicles. The shock is absorbed by forcing fluid through preferably spring-loaded ports in a piston from one compartment and into another in a fluid-charged cylinder.

When obstacles in the road are driven over rapidly, the absorption is high enough to introduce sudden forces into the suspension due to the dashpot operating too "hard". The use of blow-off valves that respond and permit fluid to flow from the compartment more remote from the piston rod and into the compartment adjacent thereto is accordingly known from German 2 340 987. Such valves do not respond, however, while the dashpot is operating normally.

There are drawbacks to the blow-off system disclosed in German 2 340 987 A1. First, it is controlled by controls inside the piston rod. Again, the hydraulic blow-off flow also travels through the piston rod. Such an approach cannot be employed if the piston-rod bore also accommodates other controls and flow diverters or electric and pneumatic lines as in the embodiment known from German 10 138 487 C1 for example.

SUMMARY OF THE INVENTION

The object of the present invention is accordingly a hydraulic dashpot blow-off valve that can be accommodated along with the hydraulic lines that serve it outside the piston rod or an extension thereof.

The present invention has several advantages. In particular, the blow-off valve can be employed in dashpots that have piston rods already accommodating subassemblies and other components in a central bore. The valve can also be installed subsequently in dashpots with any combination of piston rod and valve to comply with the overall vehicle design.

BRIEF DESCRIPTION OF THE DRAWINGS

One embodiment of the present invention will now be specified by way of example with reference to the accompanying drawing, which comprises a single FIGURE, a section through a dashpot in the vicinity of the piston.

DESCRIPTION OF THE PREFERRED EMBODIMENTS

The dashpot includes a fluid-charged cylinder 1. A shock-absorbing piston 3 travels back and forth inside piston 3 on the end of a piston rod 2. The piston is provided with breaches 4 and with shock-absorbing valves in the form of a stack 5 of resilient discs. It partitions the dashpot into two compartments 6 and 7. With piston rod 2 traveling in the suction phase, the fluid will flow out of upper compartment 6 and into lower compartment 7 through piston 3, decelerated by breaches 4 and stack 5. In the compression phase, the fluid will flow through piston 3 from lower compartment 7 and into upper compartment 6.

The piston rod 2 in the illustrated embodiment is provided with an extension 8, upon which piston 3, stack 5, etc. are mounted, secured at the bottom by a threaded nut 9 and a washer 10. Extension 8 is screwed into the hollow piston rod 2 at a narrow section 11.

A bore 12 extends along the center of piston rod 2 and accommodates schematically illustrated operating components 13.

Extension 8 is provided in the vicinity of piston 3, stack 5, nut 9, and washer 10 with at least one axially extending inwardly undulating groove 14. Groove 14 merges into a ring 15 above the uppermost disc in stack 5. Ring 15 can be either a separate component mounted on the extension as in the illustrated example, or integrated into it. Although the drawing represents only one groove 14, at least four are usually employed, distributed equally along the circumference.

The surface of ring 15 facing away from piston 3 is surrounded by an annular depression 16 surrounded in turn by an annular bed 17. Above depression 16 and resting on bed 17 is a spring-loaded disc 18. Disc 18 is less flexible than the discs in stack 5. Depression 16 communicates hydraulically with grooves 14. Depression 16 can be capped with a stack of discs like stack 5 instead of with the single disc 18.

Disc 18 is rigid enough to prevent it from lifting off of bed 17 in normal operation, during which the shock is absorbed by stack 5. Only when the dashpot is subjected to shock due to the vehicle being driven at high speed over a large obstacle in the road will the blow-off valve comprising disc 18 and bed 17 respond. In this event, piston rod 2 will travel into cylinder 1, and the pressure in upper compartment 6 will increase suddenly. Only now can the fluid flow through groove 14, breach 19, and depression 16, with disc 18 lifting off of bed 17.

In one alternative to the illustrated embodiment, groove 14 can extend through stack 5, piston 3, and nut 9 instead of through extension 8. This approach, however, entails the drawback that the various components must be very precisely aligned, and it should be considered only when there is not enough material in the extension to accommodate groove 14 at that point.

LIST OF PARTS 1. cylinder
2. piston rod
3. piston
4. breach
5. stack
6. upper compartment
7. lower compartment
8. extension
9. nut
10. washer
11. section
12. bore
13. operating components
14. groove
15. ring
16. depression
17. bed
18. disc
19. breach

What is claimed is:

1. A blow-off valve for a hydraulic dashpot, comprising: a fluid charged cylinder; a piston on an end of a piston rod and traveling back and forth in said cylinder, said piston dividing said cylinder into two chambers; ducts and shock absorbing valves in said piston; at least a part of said piston rod being hollow and having operating components; said piston rod having an outer surface with at least one axial inwardly undulating groove having a length at least as long as a height of said piston including said operating components and fastenings.

2. The blow-off valve for a hydraulic dashpot as defined in claim 1, including an extension on said piston rod for holding said operating components and fastenings.

3. A blow-off valve for a hydraulic dashpot, comprising: a fluid charged cylinder; a piston on an end of a piston rod and traveling back and forth in said cylinder, said piston dividing said cylinder into two chambers; ducts and shock absorbing valves in said piston; at least a part of said piston rod being hollow and having operating components; said piston rod having a bore with at least one radially outward groove; and a spring-loaded valve for closing said groove at an end of a compression phase of said piston.

4. The blow-off valve for a hydraulic dashpot as defined in claim 3, including an extension on said piston rod for holding said operating components and fastenings.

5. The blow-off valve as defined in claim 3, wherein said groove opens into an annular depression outside said piston; said groove having a bed; said spring-loaded valve comprising a disc with an edge resting on said bed.

6. The blow-off valve as defined in claim 4, wherein said groove opens into an annular depression outside said piston; said groove having a bed; said spring-loaded valve comprising a disc with an edge resting on said bed.

* * * * *